(12) United States Patent
Nishida et al.

(10) Patent No.: US 11,084,544 B2
(45) Date of Patent: Aug. 10, 2021

(54) FRONT BODY STRUCTURE OF VEHICLE

(71) Applicant: MAZDA MOTOR CORPORATION, Hiroshima (JP)

(72) Inventors: Shuhei Nishida, Hiroshima (JP); Michiya Mizokane, Hatsukaichi (JP); Satoshi Okamoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 93 days.

(21) Appl. No.: 16/496,911

(22) PCT Filed: Feb. 21, 2018

(86) PCT No.: PCT/JP2018/006124
§ 371 (c)(1),
(2) Date: Sep. 23, 2019

(87) PCT Pub. No.: WO2018/180026
PCT Pub. Date: Oct. 4, 2018

(65) Prior Publication Data
US 2020/0102026 A1    Apr. 2, 2020

(30) Foreign Application Priority Data

Mar. 28, 2017  (JP) .............................. JP2017-063584

(51) Int. Cl.
*B62D 35/00* (2006.01)
*B62D 35/02* (2006.01)
(Continued)

(52) U.S. Cl.
CPC .......... *B62D 35/02* (2013.01); *B60R 13/0861* (2013.01); *B60R 19/24* (2013.01); *B62D 21/09* (2013.01); *B62D 25/16* (2013.01)

(58) Field of Classification Search
CPC .... B62D 25/16; B62D 25/161; B62D 35/005; B62D 35/02; B62D 37/02; B60R 13/0861
(Continued)

(56) References Cited

U.S. PATENT DOCUMENTS 4,447,067 A * 5/1984 Yamashita ........... B62D 25/161
                                                     280/848
4,778,212 A * 10/1988 Tomforde ............ B62D 35/005
                                                     296/180.1
(Continued)

FOREIGN PATENT DOCUMENTS

JP    S50-81542 U    7/1975
JP    2007-090976 A    4/2007
(Continued)

OTHER PUBLICATIONS

International Search Report issued in PCT/JP2018/006124; dated May 15, 2018.

*Primary Examiner* — Gregory A Blankenship
(74) *Attorney, Agent, or Firm* — Studebaker & Brackett PC

(57) ABSTRACT

Deflector are disposed below, in a vertical direction of a vehicle body, right and left ends of a front bumper to suppress flowing of traveling air from the from side into wheel houses. Splash shields are disposed between a pair of front side frames and a sub-frame to suppress flowing of the air from an engine room into the wheel houses. Ducts are provided at right and left ends of the front bumper. Each of the ducts includes an intake port that takes in the traveling air from the front side, and a discharge port that discharges the traveling air taken in from the intake port into the wheel houses.

15 Claims, 12 Drawing Sheets

(51) Int. Cl.
*B60R 13/08* (2006.01)
*B60R 19/24* (2006.01)
*B62D 21/09* (2006.01)
*B62D 25/16* (2006.01)

(58) Field of Classification Search
USPC .................................................. 296/180.1
See application file for complete search history.

(56) References Cited

U.S. PATENT DOCUMENTS

| | | | | |
|---|---|---|---|---|
| 5,511,847 | A * | 4/1996 | Weisbarth | B60C 23/18 296/180.1 |
| 6,070,933 | A * | 6/2000 | Tsukidate | B62D 35/005 296/180.1 |
| 10,124,838 | B2 * | 11/2018 | Shibutake | B62D 35/02 |
| 2006/0186660 | A1 * | 8/2006 | Cushman | B62D 25/161 280/848 |
| 2006/0214474 | A1 * | 9/2006 | Omiya | B60R 13/0861 296/198 |
| 2009/0152901 | A1 * | 6/2009 | Takeuchi | B62D 25/161 296/203.01 |
| 2011/0080019 | A1 * | 4/2011 | Castillo | B62D 25/182 296/180.1 |
| 2012/0013146 | A1 * | 1/2012 | Wolf | B62D 35/02 296/180.5 |
| 2013/0026790 | A1 * | 1/2013 | Kakiuchi | B62D 35/02 296/193.07 |
| 2015/0166119 | A1 * | 6/2015 | Kim | B60R 13/0861 156/221 |
| 2015/0210324 | A1 * | 7/2015 | Kojima | B62D 35/005 296/180.1 |
| 2015/0225026 | A1 * | 8/2015 | Ohira | B62D 25/08 296/180.1 |
| 2015/0266522 | A1 * | 9/2015 | Ishikawa | B62D 35/005 296/180.1 |
| 2016/0176385 | A1 * | 6/2016 | Wolf | F16D 65/847 296/208 |
| 2016/0272258 | A1 * | 9/2016 | Gibson | B62D 37/02 |
| 2016/0339970 | A1 * | 11/2016 | Shibutake | B62D 25/2036 |
| 2017/0015190 | A1 * | 1/2017 | Yoon | B60K 11/04 |
| 2017/0057567 | A1 * | 3/2017 | Aoki | B62D 37/02 |
| 2017/0101137 | A1 * | 4/2017 | Tesch | B62D 35/005 |
| 2017/0144636 | A1 * | 5/2017 | Schmidt | F16D 65/847 |
| 2017/0166267 | A1 * | 6/2017 | Ribaldone | B62D 37/02 |
| 2017/0355333 | A1 * | 12/2017 | Kishima | B62D 35/005 |
| 2018/0050731 | A1 * | 2/2018 | Job | B62D 25/18 |
| 2018/0099703 | A1 * | 4/2018 | Yoon | B62D 25/182 |
| 2018/0251165 | A1 * | 9/2018 | Shibutake | B62D 35/005 |
| 2019/0061838 | A1 * | 2/2019 | Lee | B62D 35/001 |
| 2019/0061842 | A1 * | 2/2019 | Thullier | B62D 37/02 |
| 2019/0168826 | A1 * | 6/2019 | Wolf | B62D 35/005 |
| 2019/0176899 | A1 * | 6/2019 | Miwa | B62D 25/18 |
| 2019/0276098 | A1 * | 9/2019 | Fauser | B62D 35/02 |
| 2019/0308667 | A1 * | 10/2019 | Hauenstein | B29C 53/24 |
| 2020/0010129 | A1 * | 1/2020 | Ikawa | B62D 35/005 |
| 2020/0102026 | A1 * | 4/2020 | Nishida | B62D 35/02 |
| 2020/0108684 | A1 * | 4/2020 | Parry-Williams | B60G 3/20 |
| 2020/0114987 | A1 * | 4/2020 | Kitashiba | B60G 3/10 |
| 2020/0130755 | A1 * | 4/2020 | Nishida | B62D 35/005 |
| 2020/0207427 | A1 * | 7/2020 | Nakata | B62D 35/005 |
| 2020/0207428 | A1 * | 7/2020 | Nakata | B62D 35/005 |
| 2020/0239087 | A1 * | 7/2020 | Nakamura | B62D 35/005 |
| 2020/0361545 | A1 * | 11/2020 | Nichols | B62D 25/18 |
| 2021/0016845 | A1 * | 1/2021 | Knauer | B62D 35/005 |

FOREIGN PATENT DOCUMENTS

| | | |
|---|---|---|
| JP | 2013-014232 A | 1/2013 |
| JP | 2014-054957 A | 3/2014 |
| JP | 2014-076728 A | 5/2014 |

* cited by examiner

FRONT BODY STRUCTURE OF VEHICLE

TECHNICAL FIELD

The present invention relates to a vehicle front body structure.

BACKGROUND ART

A traveling vehicle travels against traveling air that generates an aerodynamic drag. The aerodynamic drag has a considerable effect on fuel consumption of a vehicle, in particular, when the vehicle is traveling at a high speed. Measures have been taken to reduce the aerodynamic drag by, for example, suppressing the turbulent air in the flank of the vehicle body.

One of the causes of the turbulent air in the flank of the vehicle body is the air flowing out of a wheel house to the flank of the vehicle body.

Interaction between the traveling air flowing along the flank of the vehicle body and the air flowing out of the wheel house is described as follows. The traveling air from the front side flows beneath a front bumper then into the wheel house and also through an engine room then into the wheel house. The traveling air colliding against the front bumper is divided into right and left portions which then flows around the right and left corner ends of the front bumper and toward the rear side. A negative pressure is created in the rear side of the corner ends of the front bumper. The air flown into the wheel house is suctioned out of the wheel house through the front side of a front wheel by the negative pressure. This creates a vortex outside the vehicle at the wheel house. The vortex develops into a turbulent flow that flows along the flank of the vehicle body, thereby increasing the aerodynamic drag acting on the flank of the vehicle body.

In view of such a problem, Patent Literature 1 discloses a vehicle body structure including ducts provided at right and left ends of a front bumper provided in the front part of the vehicle body, where the duct includes an inlet port for taking in traveling air from the front side and a discharge port opened in a rearward face of a wheel house housing a front wheel to face the forward face of the front wheel.

In the structure disclosed in Patent Literature 1, traveling air taken in from the inlet port and discharged from the discharge port makes contact with the forward face of the front wheel, and thus forms an air curtain between the rearward face of the wheel house and the forward face of the front wheel to separate the inside of the wheel house and the outside of the vehicle. As a result, the structure disclosed in Patent Literature 1 suppresses the air, which has flown into the wheel house, flowing out through the front side of the front wheel to the outside of the vehicle. This suppresses collision of the air discharged out of the wheel house into a region in the laterally outer side of the front wheel and the air flowing along the flank of the vehicle body. Accordingly, the structure disclosed in Patent Literature 1 may reduce the aerodynamic drag caused by detachment of air and vortexes occurring in the flank of the vehicle body.

CITATION LIST

Patent Literature

Patent Literature 1: JP 2014-76728A

SUMMARY OF INVENTION

However, the air curtain disclosed in Patent Literature 1 solely cannot completely prevent the air flown into the wheel house from flowing out to the flank of the vehicle body. In particular, when a large volume of air flows into the wheel house or when the pressure inside the wheel house is high, a large volume of air flows out to the flank of the vehicle body and might increase the aerodynamic drag.

An object of the present disclosure is to provide a vehicle front body structure that suppresses, when the vehicle is traveling, flowing of the air from the front side of the vehicle body and the engine room into the wheel house, to suppress the volume of the air flowing out of the wheel house to the flank of the vehicle body, thereby suppressing air turbulence in the flank of the vehicle body to reduce the aerodynamic drag.

A vehicle front body structure according to an aspect of the present disclosure includes a front bumper disposed in a front portion of a vehicle body, wheel houses provided in right and left sides of the vehicle body, respectively, in a rear side of the front bumper, a pair of front side frames provided in right and left portions, respectively, in the rear side of the front bumper, each of the front side frames extending in the front-and-rear direction, a sub-frame disposed below the front side frames and between the right and left wheel houses, deflectors disposed below right and left ends of the front bumper, respectively to suppress flowing of traveling air from a front side into the wheel houses, splash shields provided between the respective front side frames and the sub-frame to suppress flowing of air from an engine room into the wheel houses, and ducts provided at the right and left ends of the front bumper, respectively and each including an intake port that takes in traveling air from the front side, and a discharge port that discharges the traveling air taken in from the intake port into the wheel houses.

The splash shield extends toward the upper side from the upper portion of the sub-frame to separate the engine room from the wheel house. A plurality of recessed parts extending upward the upper side are provided in the lower edge of the splash shield.

The plurality of recessed parts are disposed over a plurality of shaft members penetrating into the wheel house from the engine room. The discharge port of the duct has a vertically elongate shape to discharge traveling air to a vertically elongate region on the front portion of the front wheel in the wheel house.

DESCRIPTION OF EMBODIMENTS

Figure 1:
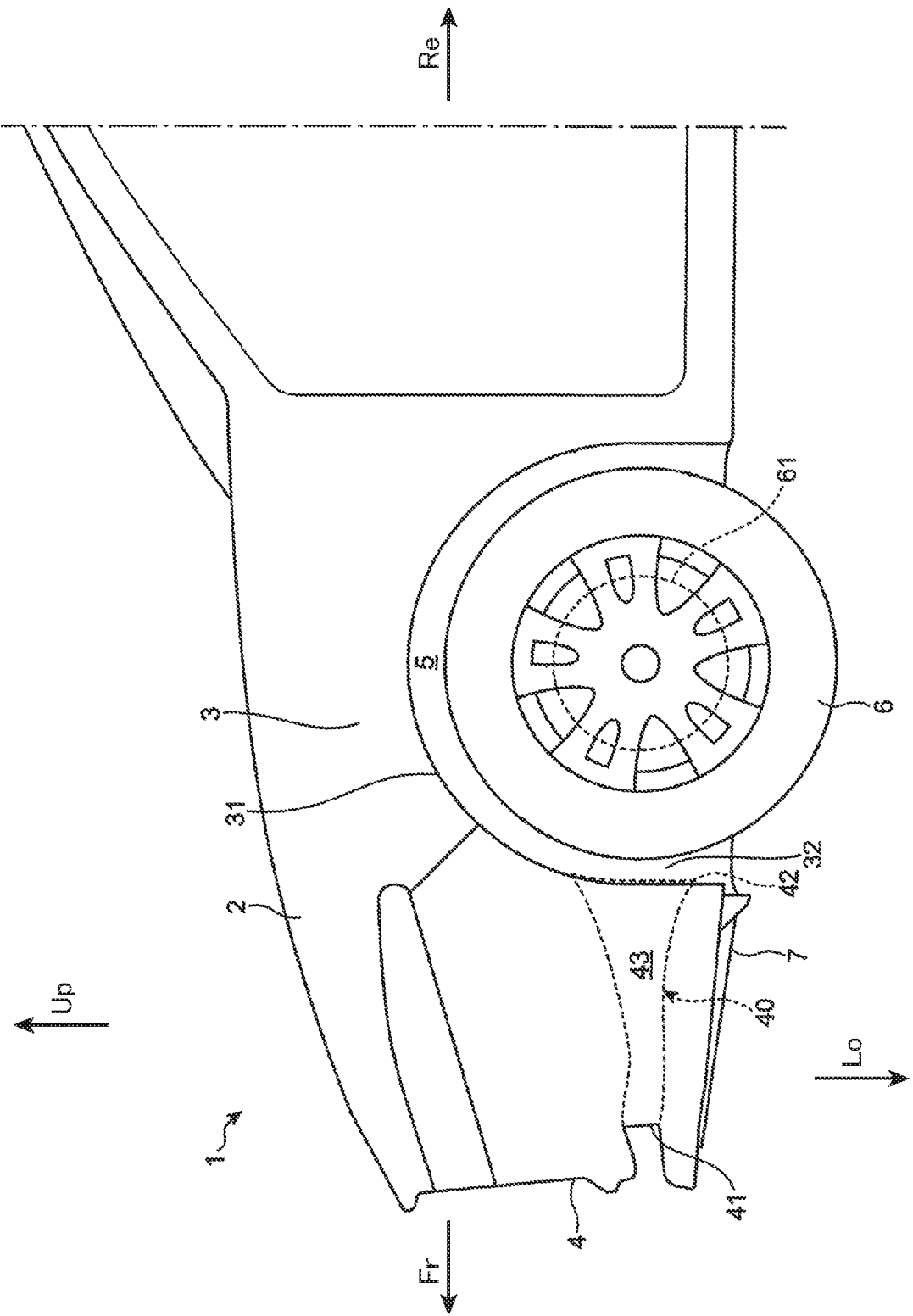
FIG. 1 is a left side view illustrating a vehicle front body structure according to an embodiment.

A vehicle front body structure according to an embodiment will be described in detail below. The description will be made on the front body structure in the left side of the vehicle illustrated in the drawings.

In the drawings, "Up" indicates the upper side of the vehicle body, "Lo" indicates the lower side of the vehicle body, "Fr" indicates the front side of the vehicle body, "Re" indicates the rear side of the vehicle body, "Le" indicates the left side of the vehicle body, "Ri" indicates the right side of the vehicle body, "In" indicates the inner side of the vehicle body, and "Out" indicates the outer side of the vehicle body.

As illustrated in FIG. 1, the front part of a vehicle body 1 includes a hood 2 covering the upper face of the front part of the vehicle body, front fenders 3 covering the right and left side faces of the vehicle body (hereinafter, only the front fender 3 in the left side is illustrated), and a front bumper 4 covering the front part of the vehicle body, namely, from the front portion to the right and left side portions of the vehicle body. The front bumper 4 extends in the lateral direction and continues to the front fender 3.

Wheel houses 5 each having an approximately semicircular shape and opened downward are provided in the flank of the vehicle body, each of the wheel houses 5 being provided across the boundary between the front bumper 4 and the front fender 3 (hereinafter, only the wheel house 5 in the left side is illustrated). Wheel arches 31 of the front fenders 3 each constitute the wheel house 5. Fender liners 32 are each coupled to the inside of the wheel arch 31 (hereinafter, only the fender liner 32 in the left side is illustrated). The fender liner 32 has an approximately cylindrical face to form the shape of the wheel house 5 (see FIG. 3). Front wheels 6 are each disposed in the wheel house 5 (hereinafter, only the front wheel 6 in the left side is illustrated). A brake rotor or a brake drum 61 constituting a braking device of the vehicle is provided in each of the front wheels 6.

Figure 2:
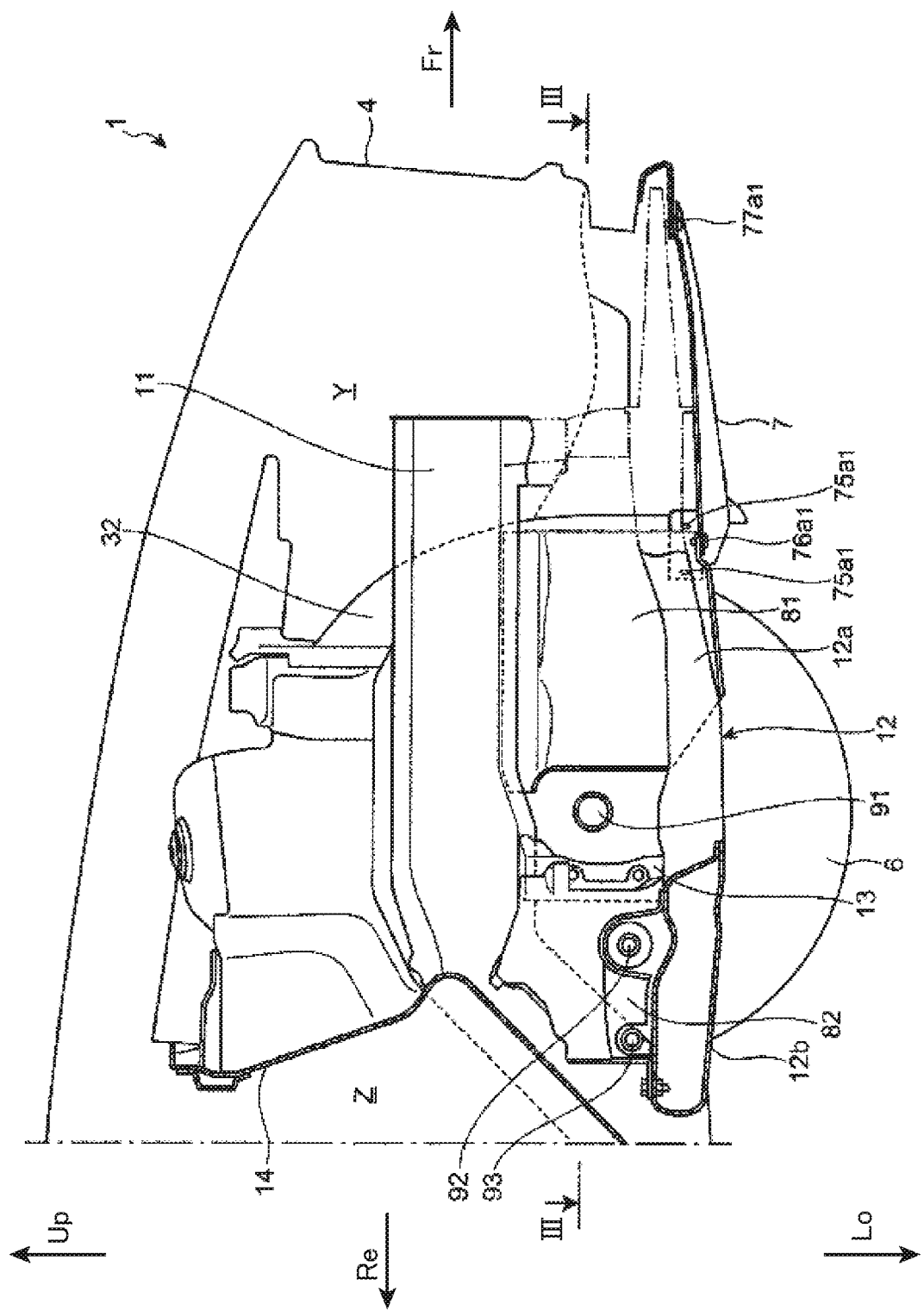
FIG. 2 is a right side cross-sectional view of the front body structure viewed from a vehicle interior.

As illustrated in FIG. 2, the vehicle body 1 includes a pair of right and left front side frames 11 each extending in the front-and-rear direction (hereinafter, only the front side frame 11 in the left side is illustrated), a sub-frame 12 disposed below the front side frames 11, and vehicle structural members 13 (hereinafter, only the vehicle structural member 13 in the left side is illustrated) each connecting the sub-frame 12 and one of the front side frames 11. A dash panel 14 extending in the lateral direction and separating an engine room Y from a vehicle interior Z is provided between the pair of front side frames 11.

Figure 3:
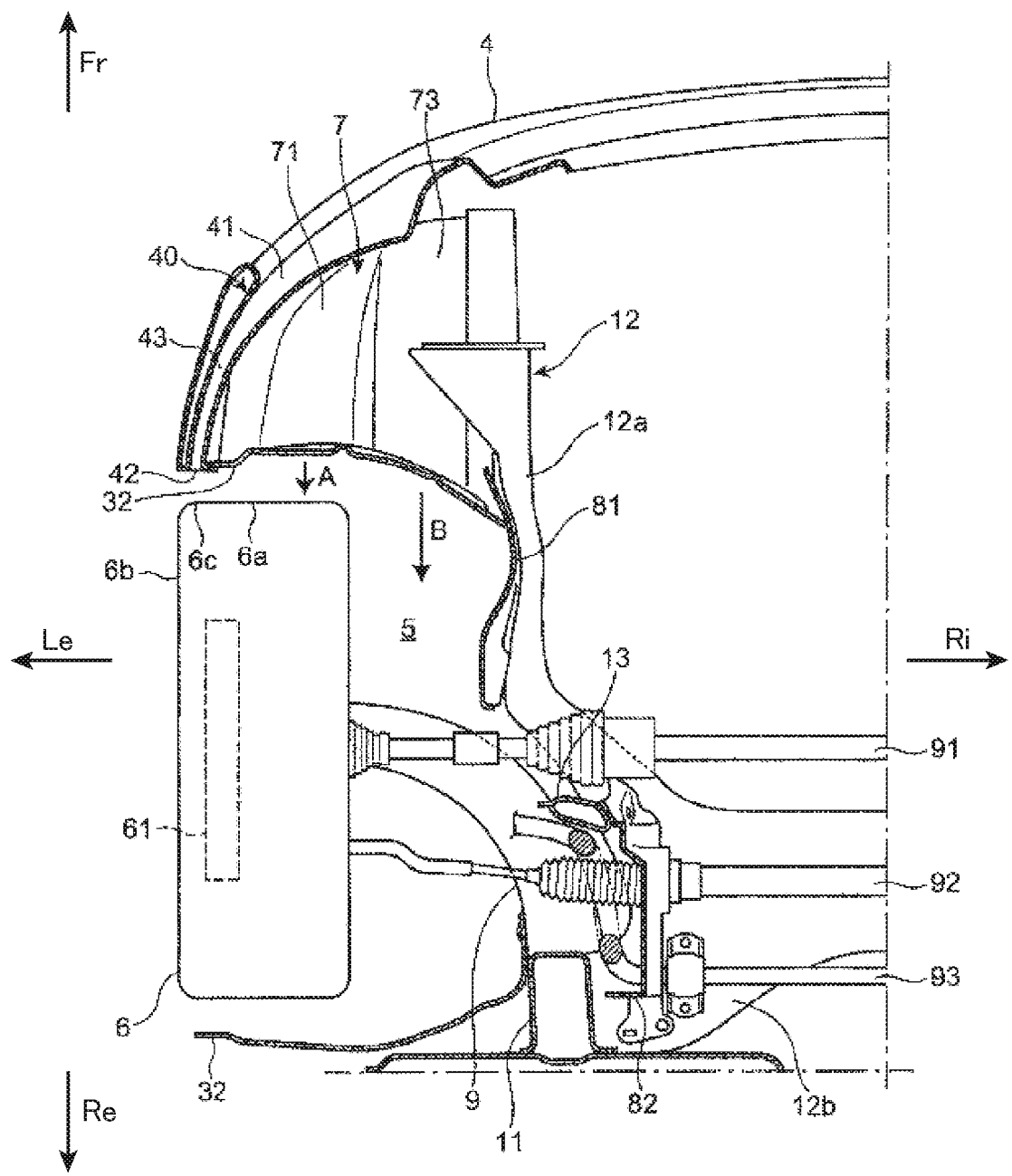
FIG. 3 is a cross-sectional view taken along a line III-III in FIG. 2 illustrating the front body structure.

As illustrated in FIGS. 2 and 3, the sub-frame 12 includes a pair of side members 12a provided in the right and left sides, in the lateral direction, to extend in the front-and-rear direction of the vehicle (hereinafter, only the side member 12a in the left side is illustrated), and a cross member 12b extending in the lateral direction to connect rear portions of the side members 12a.

Above the cross member 12b of the sub-frame 12, a drive shaft 91, a steering rack 92, and a stabilizer 93 are provided as shaft members penetrating into the wheel houses 5 and 5 from inside the engine room Y. The shaft members 91, 92, and 93 are disposed in this order in the direction from the front side to the dash panel 14. The shaft members 91, 92, and 93 penetrate into the wheel houses 5 and 5 from inside the engine room Y to connect the right and left front wheels 6 and 6. Suspension arms 9 and 9 which are suspension members for the front wheels 6 and 6 are supported by the cross member 12b of the sub-frame 12.

In addition to the configuration described above, the vehicle body 1 includes members constituting a structure for improving the aerodynamic performance in the flank of the vehicle body. The members are deflectors 7 fixed below the right and left ends of the front bumper 4 (hereinafter, only the deflector 7 in the left side is illustrated), front and rear splash shields 81 and 82 provided to cover the space between the front side frames 11 and the sub-frame 12, and ducts 40 provided at the right and left ends of the front bumper 4 to take in the traveling air from the front side and discharge the traveling air into the wheel houses 5 (hereinafter, only the duct 40 in the left side is illustrated).

Figure 4:
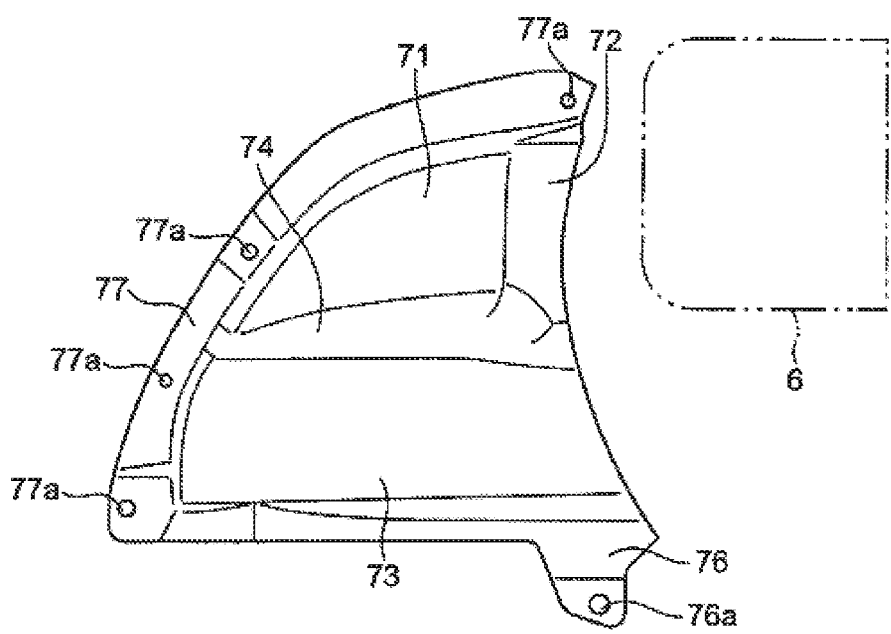
FIG. 4 is a bottom view of a single deflector.
Figure 5:
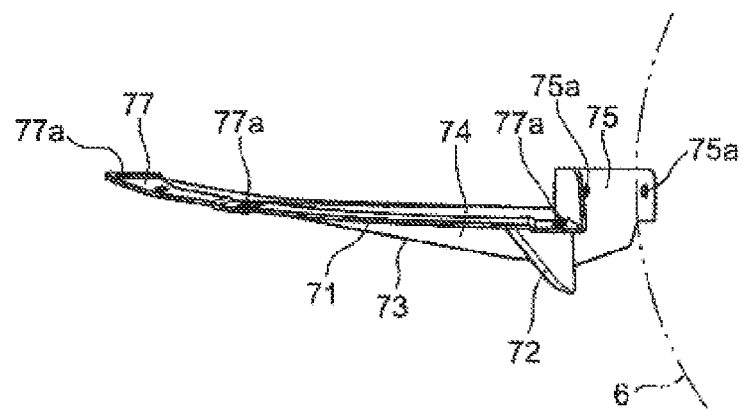
FIG. 5 is a side view of the single deflector.
Figure 6:
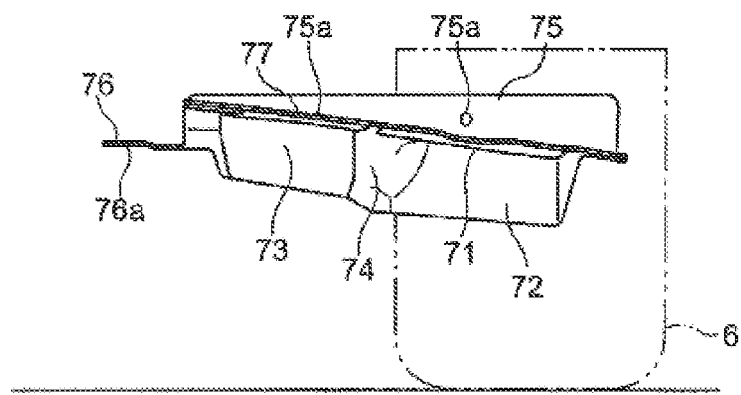
FIG. 6 is a front view of the single deflector.

As illustrated in FIGS. 4 to 6, the deflector 7 includes a horizontal portion 71 provided in front of the front wheel 6 to extend approximately in a horizontal direction, a first inclined portion 72 continuing from the rear end of the horizontal portion 71 and inclined downward at a large inclination angle toward the lower portion of the front wheel 6, a second inclined portion 73 provided further in the laterally inner side than the front wheel 6 and inclined downward at an inclination angle smaller than the inclination angle of the first inclined portion 72, and a transition portion 74 connecting the horizontal portion 71 and the first inclined portion 72 to the second inclined portion 73.

A rear flange 75 is provided at the rear end of the deflector 7 to rise up from the horizontal portion 71 and the second inclined portion 73. The rear flange 75 is fastened to the fender liner 32 by plastic clips $75a_1$ and $75a_1$. An inner flange 76 is provided at the rear end in the inner side of the deflector 7. The inner flange 76 is fastened to the front splash shield 81 by a plastic clip $76a_1$. The outer flange 77 is provided along the front end and the rim in the outer side of the deflector 7 to extend in the outer side from the horizontal portion 71 and the second inclined portion 73. The outer flange 77 is fastened to the front bumper 4 by plastic clips $77a_1, \ldots, 77a_1$.

As illustrated in FIG. 2, the deflectors 7 are fixed to the front bumper 4, the fender liners 32 and 32, and the front splash shields 81 so as to cover the areas each extending from the right or left distal end of the bottom of the front bumper 4 to the front end of the wheel house 5.

As illustrated in FIG. 2, the front splash shields 81 are provided further in the front side, in the front-and-rear direction, than the drive shaft 91, and the rear splash shields 82 are provided further in the rear side, in the front-and-rear direction, than the drive shaft 91. The rear splash shield 82 is an example of the "splash shield" of the above aspect.

The upper portion of the front splash shield 81 is fixed to the outer-lower portion of the front side frame 11 by a bolt (not illustrated) and the lower portion of the front splash shield 81 is fixed to the outer portion of the sub-frame 12 by a bolt (not illustrated). The front splash shield 81 is thereby disposed to cover the area which is between the front side frame 11 and the sub-frame 12 and further in the front side than the drive shaft 91 from the laterally outer side.

The front side of the rear splash shield 82 is fastened to the vehicle structural member 13, which connects the front side frame 11 and the sub-frame 12, by bolts 83, . . . , 83, and the rear side of the rear splash shield 82 is fixed to the upper face of the sub-frame 12 by a bolt 83. The rear splash shield 82 is thereby disposed to cover the area which is between the front side frame 11 and the sub-frame 12 and further in the rear side, in the front-and-rear direction, than the drive shaft 91.

Figure 7:
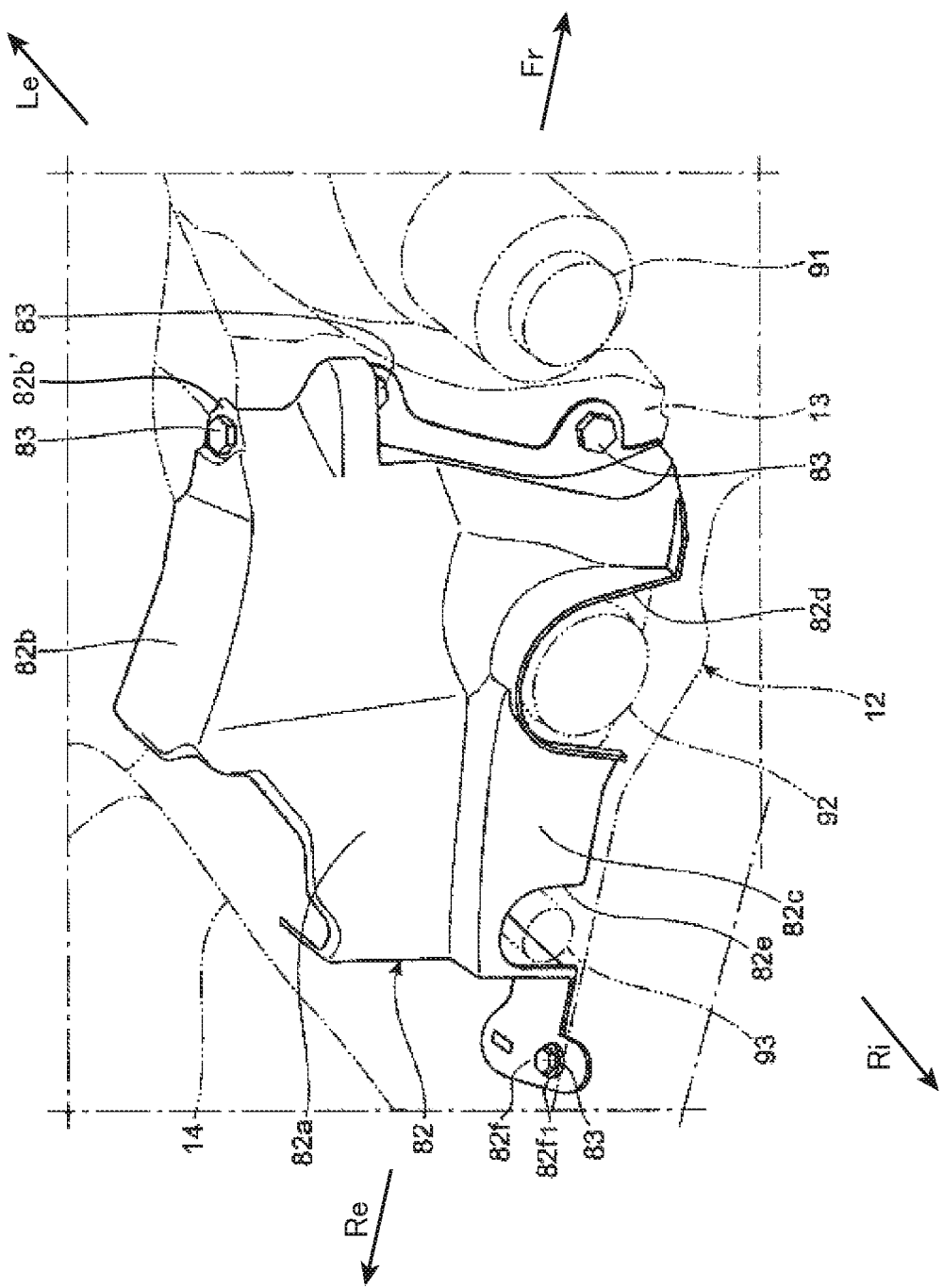
FIG. 7 is a perspective view of a splash shield.

As illustrated in FIG. 7, the rear splash shield 82 includes a vertical portion 82a that extends in the vertical direction to separate the engine room Y from the wheel house 5. A flange part 82b extends outward along the lateral direction from the upper end of the vertical portion 82a. The rear splash shield 82 is coupled by a bolt 83 to the vehicle structural member 13 via a fastening portion 82b' provided on the flange part 82b. The rear splash shield 82 includes a stepped portion 82c provided in the lower face of the vertical portion 82a, a first recessed part 82d provided in the front side of the stepped portion 82c and formed to half encircle the outer circumferential face of the steering rack 92 (formed in an approximately arc shape with an opening that allows the steering rack 92 to pass therethrough), and a second recessed part 82e provided in the rear side of the stepped portion 82c and formed to half encircle the outer circumferential face of the stabilizer 93 (formed in an approximately arc shape with an opening allowing the stabilizer 93 to pass therethrough). A flange 82f is provided at the rear end, in the front-and-rear direction, of the rear splash shield 82 at a place lower than the vertical portion 82a to extend in the rear side. A fastening portion $82f_1$ provided on the flange 82f is coupled to the cross member 12b of the sub-frame 12 by a bolt 83.

As illustrated in FIGS. 2 and 3, the front and rear splash shields 81 and 82 separate the engine room Y from the wheel houses 5.

As illustrated in FIGS. 1 and 3, the ducts 40 are provided at the right and left ends of the front bumper 4. The ducts 40 each include an intake port 41, a discharge port 42, and a passage 43. The intake ports 41 are provided at both lateral ends of the front bumper 4 to open to the front side of the vehicle body.

The discharge port 42 of the duct 40 has a vertically elongate shape and is in front of the wheel house 5. The traveling air is discharged from the discharge port 42 to a vertically elongate region on the front portion 6a of the front wheel 6. The discharge port 42 ate duct 40 is formed so that the traveling air passing through the duct 40 collides against an edge 6c (R-end) between the front portion 6a and a flank 6b of the front wheel 6 facing the outside of the vehicle. For example, the discharge port 42 has a shape laterally centered on the edge 6c of the front wheel 6 and having a 5 mm width from the center in both sides.

Figure 8:
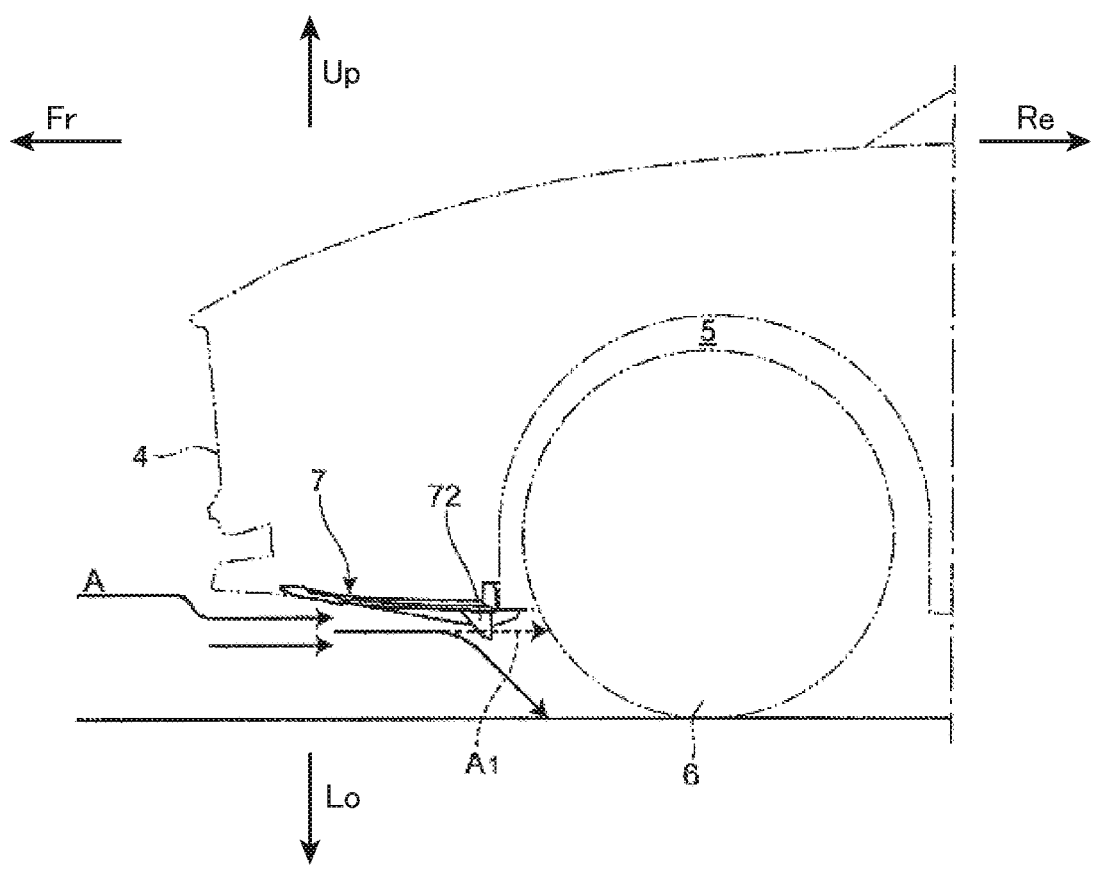
FIG. 8 illustrates a first inclined portion of the deflector.
Figure 9:
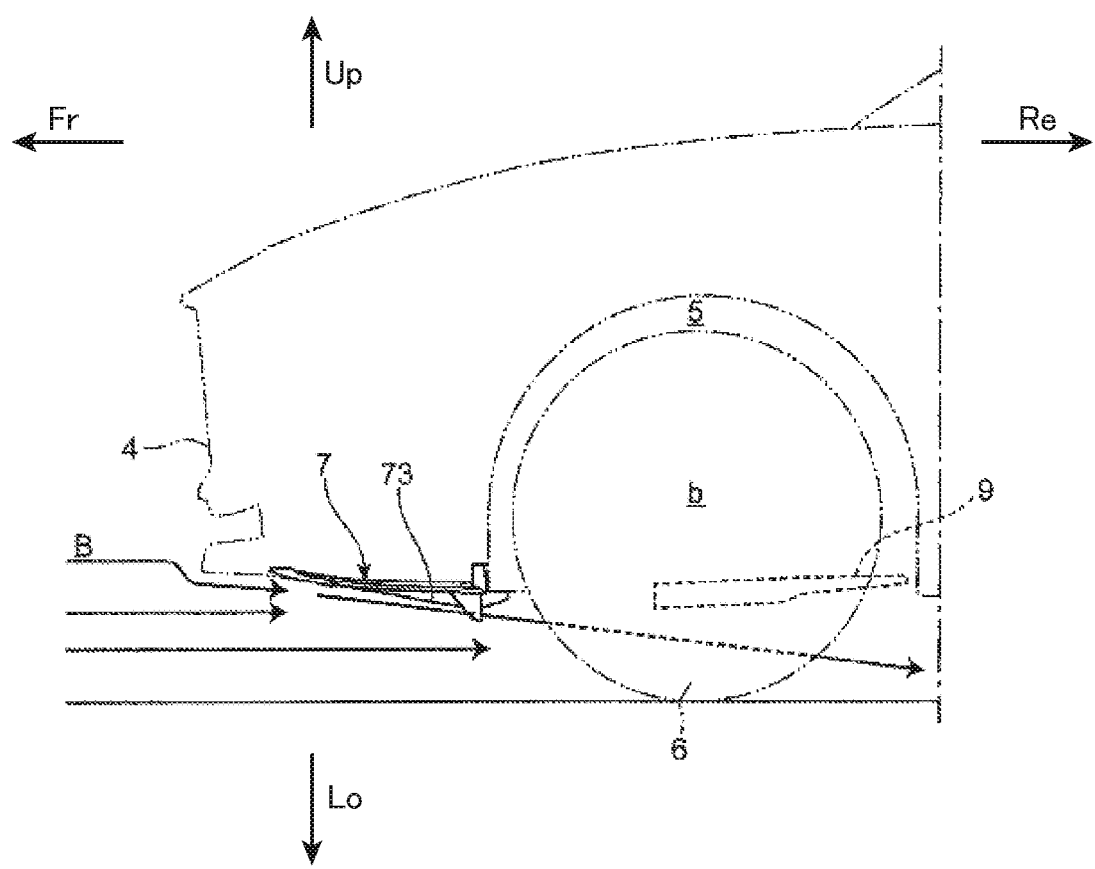
FIG. 9 is an explanatory view for describing an effect of a second inclined portion of the deflector.

An effect performed by the deflector 7 when the traveling air from the front side collides against the front bumper 4 will be described with reference to FIGS. 8 and 9. FIG. 8 illustrates traveling air A flowing along the first inclined portion 72 of the deflector 7. FIG. 9 illustrates traveling air B flowing along the second inclined portion 73 of the deflector 7.

As illustrated in FIG. 8, the traveling air A from the front side collides against the front bumper 4, turns and flows along the flank of the vehicle body, and also flows beneath the front bumper 4. The traveling air. A passes by the horizontal portion 71 of the deflector 7 to reach the first inclined portion 72 of the deflector 7, and then the traveling air A is deflected downward along the first inclined portion 72 to flow toward the front side of the front wheel 6. Thus, direct collision of the traveling air A against the front wheel 6 is avoided as indicated by an arrow $A_1$, for example, and this suppresses the pressure rise in the wheel house 5.

As illustrated in FIG. 9, the traveling air B from the front side collides against the front bumper 4, turns and flows along the flank of the vehicle body, and also flows beneath the front bumper 4. Since the traveling air B passing by the second inclined portion 73 of the deflector 7 is inclined to flow beneath the suspension arm 9 and collision of the traveling air B against the deflector 7 like the traveling air A colliding against the first inclined portion 72 is avoided, the air smoothly flows along the deflector 7 from the distal end thereof to the rear side.

An effect achieved by the duct 40 when the traveling air from the front side collides against the front bumper 4 will be described with reference to FIGS. 10 and 11.

Figure 10:
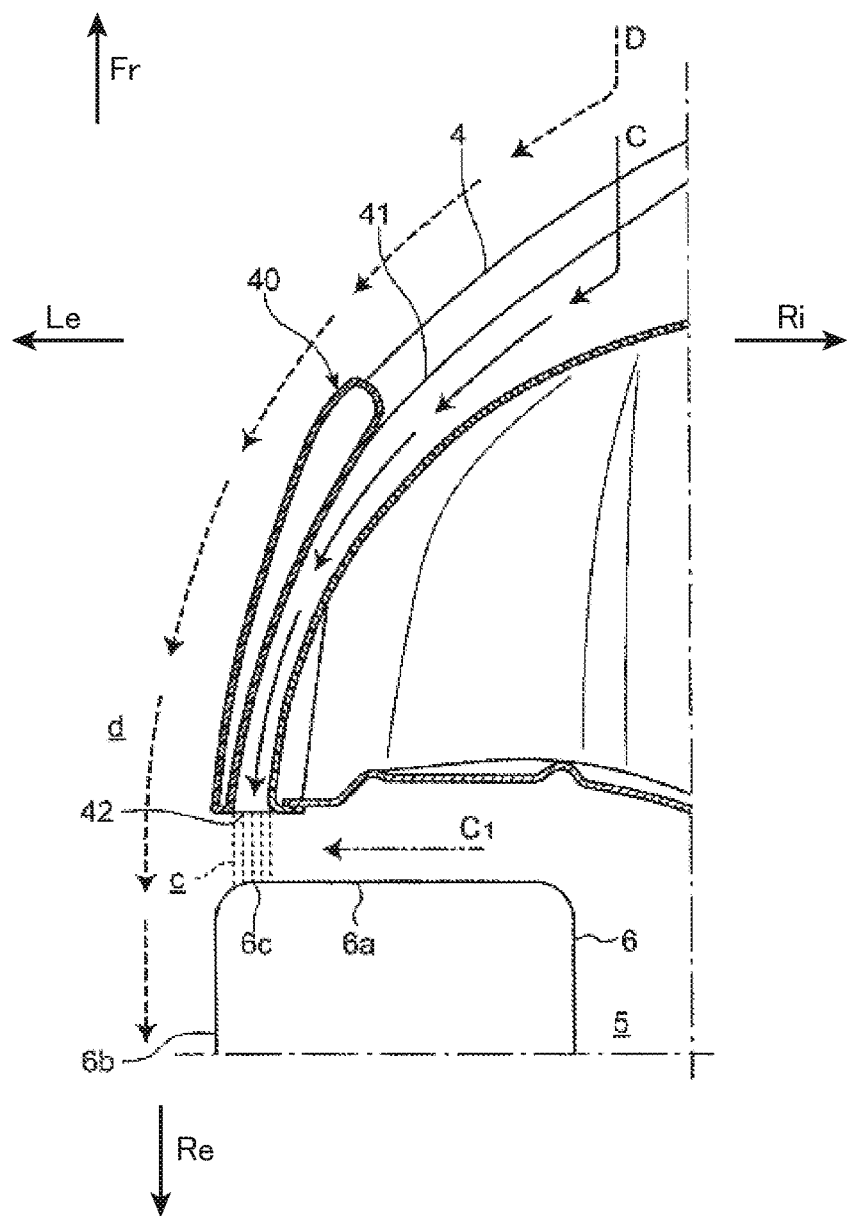
FIG. 10 is a cross-sectional view illustrating the front body structure in FIG. 3, where only a duct and a peripheral portion thereof are illustrated.

As illustrated in FIG. 10, the traveling air C from the front side collides against the front bumper 4, is taken in from the intake port 41 of the duct 40, and discharged from the discharge port 42 to make contact with the front wheel 6 in the wheel house 5. An air curtain c is thereby formed between the discharge port 42 of the duct 40 and the front wheel 6 to separate the inside of the wheel house 5 from the outside of the vehicle.

Figure 11:
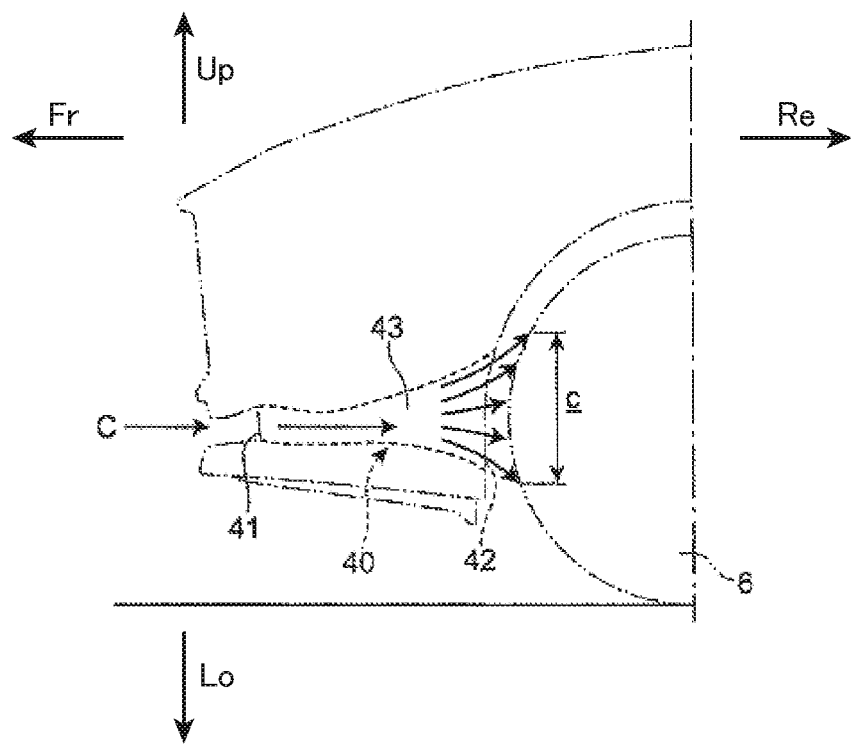
FIG. 11 is an explanatory view for describing an effect of the duct.
Figure 12:
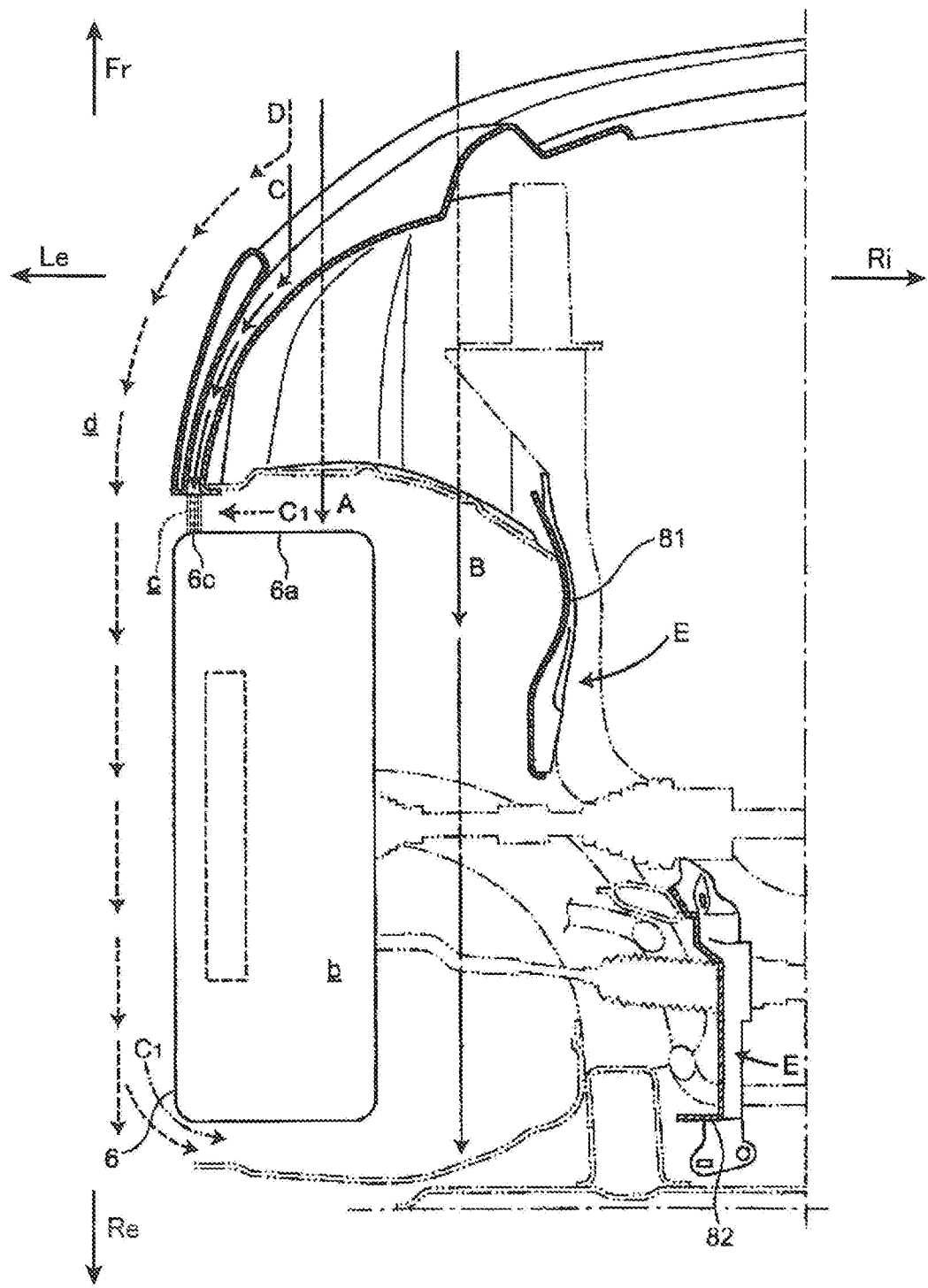
FIG. 12 is a cross-sectional view in the same angle as FIG. 3 for describing an effect of the vehicle front body structure.

As described above, the traveling air C from the front side is taken in from the intake port 41 of the duct 40 and discharged from the discharge port 42 as illustrated in FIG. 11. The traveling air C is discharged through the vertically elongate opening of the discharge port 42. With the traveling air C discharged toward the vertically elongate region on the front portion 6a of the front wheel 6 in the wheel house 5, the air curtain c is provided in a vertically broad area in a side view of the vehicle body.

With the configuration described above, the traveling air from the front side and flowing beneath the front bumper 4, when the vehicle is traveling, flows into the wheel house 5 and is deflected by the first inclined portion 72 and the second inclined portion 73 of the deflector 7 to flow in the directions respectively indicated by an arrow A and an arrow B as illustrated in FIGS. 8 and 9.

The traveling air flowing in the laterally outer side along the first inclined portion 72 of the deflector 7 is deflected to avoid colliding against the front wheel 6 as indicated by the arrow A, thereby suppressing the pressure rise in the wheel house 5.

The traveling air flowing in the laterally inner side along the second inclined portion 73 of the deflector 7 is not disturbed and guided to the rear side without colliding against the suspension arm 9 as indicated by the arrow B.

Since the velocity of the traveling air B flowing beneath the deflector 7 is higher than the velocity of the air in the wheel house 5, a low pressure is created in the wheel house 5 in a region b further in the rear side than the deflector 7. As a result, for example, an air $C_1$ that has flown out of the wheel house 5 to the flank of the vehicle body can further reliably be suctioned into the wheel house 5. This suppresses air turbulence in the flank of the vehicle body not only at the front side but also at the rear side of the wheel house 5. Furthermore, suctioning a portion of the traveling air D flowing in the flank of the vehicle body into the wheel house 5 may have an effect of cooling a brake rotor 61 disposed in the wheel house 5.

The front and rear splash shields 81 and 82 suppress air E in the engine room Y from flowing into the wheel house 5, thereby suppressing the pressure rise in the wheel house 5.

Furthermore, the traveling air C passing through the ducts 40 disposed at both ends of the front bumper 4 forms the air curtain c between the rearward face of the wheel house 5 and the forward face of the front wheel 6 to suppress the air $C_1$, which has flown into the wheel house 5, from flowing out through the front side of the front wheel 6 to the flank of the vehicle body.

Accordingly, the pressure in the wheel house 5 can be lowered while suppressing the volume of the traveling air flowing into the wheel house 5. This helps the air curtain c separate the inside of the wheel house 5 from the outside of the vehicle to further reliably suppress the air $C_1$ from flowing out of the wheel house 5.

Traveling air D, which results from the traveling air colliding against the front bumper 4 and divided into the right and left flows, creates a negative pressure region d in the rear side of the corner end of the front bumper 4. This negative pressure region d can suction the air $C_1$ that has flown into the wheel house 5 out of the wheel house 5 through the front side of the front wheel 6. Nevertheless, the air curtain c effectively suppresses the air in the wheel house 5 from flowing out to the flank of the vehicle body. This consequently suppresses the air $C_1$ discharged from the wheel house 5 to the laterally outer side from colliding against the traveling air D in the flank of the vehicle body. Thus, the aerodynamic drag caused by detachment of air and vortexes occurring in the flank of the vehicle body is reduced.

SUMMARY OF PRESENT DISCLOSURE

A vehicle front body structure according to an aspect of the present disclosure includes a front bumper, wheel houses, a pair of front side frames, a sub-frame, deflectors, splash shields, and ducts.

The front bumper is disposed in the front part of a vehicle.

The wheel houses are provided in the right and left sides of the vehicle body, respectively, in the rear side of the front bumper.

The pair of front side frames are provided in the right and left portions, respectively in the rear side of the front bumper, each of the front side frames extending in the front-and-rear direction.

The sub-frame is disposed below the front side frames and between the right and left wheel houses.

The deflectors are disposed below the right and left ends of the front bumper, respectively to suppress flowing of the traveling air from the front side into the wheel houses.

The splash shields are disposed between the respective front side frames and the sub-frame to suppress flowing of the air from the engine room into the wheel houses.

The ducts are provided at the right and left ends of the front bumper, respectively. Each of the ducts includes an intake port for taking in the traveling air from the front side, and a discharge port for discharging the traveling air, taken in from the intake port, into the wheel house.

The splash shield extends toward the upper side from the upper portion of the sub-frame to separate the engine room from the wheel house. A plurality of recessed parts extending upward are provided in the lower edge of the splash shield.

The plurality of recessed parts are disposed over a plurality of shaft members penetrating into the wheel houses from the engine room.

The discharge port of the duct has a vertically elongate shape to discharge the traveling air to a vertically elongate region on the front portion of the front wheel disposed in the wheel house.

The vehicle front body structure according to the above aspect includes the deflectors provided below the right and left ends of the front bumper, the splash shields separating the wheel houses in the rear side of the front bumper from the engine room, and the ducts provided at the right and left ends of the front bumper. The deflectors suppress the traveling air from the front side from flowing into the wheel houses, and the splash shields suppress the air in the engine room from flowing into the wheel houses.

In the vehicle front body structure according to the above aspect, the air discharged from the discharge port of the duct provided at the front bumper makes contact with the front wheel in the wheel house, to thereby form an air curtain between the discharge port of the duct and the front wheel to separate the inside of the wheel house from the outside of the vehicle.

In the vehicle front body structure according to the above aspect, even when a negative pressure is created in the rear side of the right and left corner ends of the front bumper, suctioning of the air from the wheel house by the negative pressure is suppressed, and thus the air flowing out of the wheel house to the flank of the vehicle colliding against the air flow in the flank of the vehicle is suppressed. This reduces the aerodynamic drag caused by detachment of air and vortexes occurring in the flank of the vehicle body.

In the vehicle front body structure according to the above aspect, the splash shield extends toward the upper side from the upper portion of the sub-frame to separate the engine room from the wheel house. The splash shield has a plurality of recessed parts extending upward from the lower edge of the splash shield, where the recessed parts are disposed over a plurality of shaft members penetrating into the wheel houses from the engine room. This effectively suppresses the air in the engine room from flowing into the wheel houses.

The discharge port of the duct has a vertically elongate shape to discharge the traveling air to a vertically elongate region on the front portion of the front wheel in the wheel house, thereby forming the above-mentioned air curtain vertically broad in a side view of the vehicle body. That is, the broad plane of the air curtain separates the wheel house from the flank of the vehicle body.

Accordingly, the vehicle front body structure according to the above aspect further reliably suppresses the air from flowing out of the wheel house to the flank of the vehicle body. Thus, collision between the air flowing out of the wheel house to the flank of the vehicle body and the traveling air flowing in the flank of the vehicle body is suppressed, and thus air turbulence in the flank of the vehicle body is further reliably suppressed.

According to another aspect of the present disclosure, in the vehicle front body structure of the above aspect, the deflector includes a first inclined portion that is inclined downward at a large inclination angle toward the lower portion of the front wheel positioned in the rear side of the deflector, and a second inclined portion that is provided adjacent to and laterally further inner than the first inclined portion and inclined downward at an inclination angle smaller than the inclination angle of the first inclined portion toward a space located laterally further inner than the front wheel in the wheel house.

In the vehicle front body structure according to the above aspect, the deflector includes the first inclined portion inclined downward at a large inclination angle toward the lower portion of the front wheel positioned in the rear side of the deflector, and the second inclined portion that is provided adjacent to and laterally further inner than the first inclined portion and inclined downward at an inclination angle smaller than the inclination angle of the first inclined portion toward a space located laterally further inner than the front wheel in the wheel house. In the laterally outer portion of the deflector, the first inclined portion suppresses flowing of the traveling air into the wheel house and avoids the traveling air directly colliding against the front wheel, and thereby suppressing the pressure rise in the wheel house.

In the vehicle front body structure according to the above aspect, the second inclined portion moderately guides the traveling air in the laterally inner side to flow beneath the wheel house without disturbing the traveling air flow, and thus the aerodynamic drag caused by collision between the traveling air and the deflector is suppressed. Since the velocity of the traveling air flowing by the second inclined portion of the deflector is higher than the velocity of the air inside the wheel house, a low pressure is created in the wheel house in a region further in the rear side of the deflector. For example, the air that has been discharged out of the wheel house to the flank of the vehicle body can be suctioned into the wheel house or the rear side of the wheel house. Thus, air turbulence in the flank of the vehicle body can be suppressed not only at the front side but at the rear side of the wheel house. Furthermore, a portion of the traveling air flowing in the flank of the vehicle body can he suctioned into the wheel house or to the rear side of the wheel house, and thereby an effect of, for example, cooling a brake rotor or the like disposed in the wheel house can be obtained.

According to another aspect of the present disclosure, in the vehicle front body structure of the above aspect, the cross-section of the passage of the duct becomes laterally narrow toward the discharge port of the duct, and the discharge port of the duct is formed so that the traveling air passing through the duct collides against the edge of the front wheel when the vehicle is traveling straight, where the edge is between the front portion of the front wheel and the flank of the front wheel facing the outside of the vehicle.

In the vehicle front body structure according to the above aspect, the discharge port of the duct is formed so that the traveling air passing through the duct collides against the edge of the front wheel when the vehicle is traveling straight, where the edge is between the front portion of the front wheel and the flank of the front wheel facing the outside of the vehicle. This suppresses, when the vehicle is traveling straight, the pressure rise in the wheel house and a preferable air curtain is formed. Accordingly, the vehicle front body structure according to the above aspect further effectively reduces the aerodynamic drag that has a considerable effect on fuel consumption when the vehicle is traveling at a high speed.

That is, the vehicle front body structure according to the above aspect prevents a state in which the traveling air flows into the wheel house when the air passing through the duct is discharged further in the laterally inner side than a predetermined width at the edge of the front wheel as well as a state in which an air curtain cannot reliably be generated when the air passing through the duct is discharged further in the laterally outer side than a predetermined width at the edge of the front wheel. Thus, the vehicle front body structure according to the above aspect can provide art air curtain in a most suitable region to suppress the air from flowing out of the wheel house to the flank of the vehicle.

Furthermore, in the vehicle front body structure according to the above aspect, the discharge port of the duct is formed to be laterally narrow. With the discharge port of the duct being vertically elongate and laterally small, the decrease in the velocity of the air discharged through the duct is suppressed. As a result, the vehicle front body structure according to the above aspect creates a high velocity air flow discharged through the duct to further reliably generate the air curtain.

A vehicle front body structure according to an aspect of the present disclosure includes a front bumper, wheel houses, a pair of front side frames, a sub-frame, deflectors, splash shields, and ducts.

The front bumper is disposed in the front part, in the front-and-rear direction, of a vehicle.

The wheel houses are provided in the right and left sides, in a lateral direction, of the vehicle in the rear side of the front bumper.

The pair of front side frames are provided in the right and left, in the lateral direction, in the rear side of the front bumper, each of the front side frames extending in the front-and-rear direction.

The sub-frame is disposed below the front side frames and between the right and left wheel houses.

The deflectors are disposed below, in the vertical direction, the right and left ends of the front bumper to suppress flowing of the air from the front side into the wheel houses.

The splash shields are disposed between the pair of front side frames and the sub-frame to suppress flowing of the air from the engine room into the wheel houses.

The ducts are provided at the right and left ends of the front bumper. The duct causes the traveling air from the front side to collide against the front portion of the front wheel in the wheel house to form the air curtains between the rearward face of the wheel house and the front portion of the front wheel, thereby suppressing flowing of the air from the wheel house to the flank of the vehicle body.

The vehicle front body structure according to the above aspect includes the front bumper, the wheel houses provided at the right and left ends of the vehicle body in the rear side of the front bumper, the deflectors provided below the right and left ends of the front bumper to suppress the pressure rise in the wheel houses caused by the air flowing into the wheel houses, the splash shields that suppress the pressure rise in the wheel houses caused by the air in the engine room flowing into the wheel houses, and the ducts provided at the right and left ends of the front bumper and each causing the traveling air from the front side to collide against the front portion of the front wheel to form the air curtain. Similar to the vehicle front body structure according to the above aspect, the formed air curtain suppresses flowing of the air out of the wheel house to the flank of the vehicle while the deflector and the splash shield suppress the volume of the air flowing into the wheel house, thereby suppressing the pressure rise in the wheel house. Thus, the air flowing out of the wheel house to the flank of the vehicle body is effectively suppressed. Furthermore, in the vehicle front body structure according to the above aspect, the pressure inside the wheel house can be reduced, so that the air that has flown out of the wheel house passing the air curtain through the front side of the front wheel to the flank of the vehicle body can be suctioned into the rear side of the front wheel in the wheel house. Thus, air turbulence in the flank of the vehicle body can be suppressed.

As described above, the vehicle front body structure according to each of the above aspects suppresses the air from the front side and the air in the engine room from flowing into the wheel house, to suppress the volume of the air flowing out of the wheel house to the flank of the vehicle body when the vehicle is traveling. Thus, air turbulence in the flank of the vehicle body can be suppressed to reduce the aerodynamic drag.

The invention claimed is:

1. A vehicle front body structure comprising:
   a front bumper disposed in a front portion of a vehicle body;
   wheel houses provided in right and left sides of the vehicle body, respectively, in a rear side of the front bumper;

a pair of front side frames provided in right and left portions, respectively, in the rear side of the front bumper, each of the front side frames extending in a front-and-rear direction;

a sub-frame disposed below the front side frames and between the right and left wheel houses;

deflectors disposed below right and left ends of the front bumper, respectively to suppress flowing of traveling air from a front side into the wheel houses;

fender liners provided inside respective wheel arches constituting the respective wheel houses to cover a front side and a rear side of the respective wheel houses;

a front splash shield and a rear splash shield to suppress flowing of air from an engine room into the wheel houses, the front splash shield and the rear splash shield being provided between the respective front side frames and the sub-frame, and arranged in the front-and-rear direction so as to separate the engine room from the respective wheel houses laterally; and ducts provided at the right and left ends of the front bumper, respectively and each including an intake port that takes in traveling air from the front side, and a discharge port that discharges the traveling air, taken in from the intake port, into the wheel houses, wherein the rear splash shield extends toward an upper side from an upper portion of the sub-frame to separate the engine room from the wheel house, and includes a plurality of recessed parts extending upward from a lower rim of the rear splash shield, the plurality of recessed parts are disposed over a plurality of shaft members penetrating into the wheel houses from the engine room, and the discharge port of each of the ducts has a shape elongate in a vertical direction to discharge traveling air to a region elongate in the vertical direction on a front portion of a front wheel disposed in the wheel house.

2. The vehicle front body structure according to claim 1, wherein the deflectors each include a first inclined portion that is inclined downward at a large inclination angle toward a lower portion of the front wheel positioned in a rear side of the deflector, and a second inclined portion that is provided adjacent to and laterally further inner than the first inclined portion and inclined downward at an inclination angle smaller than the inclination angle of the first inclined portion toward a space located laterally further inner than the front wheel in the wheel house.

3. The vehicle front body structure according to claim 1, wherein
a cross-section of a passage of the duct becomes laterally narrow toward the discharge port of the duct, and
the discharge port of the duct is formed so that traveling air passing through the duct to collide against an edge of the front wheel when the vehicle is traveling straight, the edge being between the front portion of the front wheel and a flank of the front wheel facing an outside of the vehicle.

4. The vehicle front body structure according to claim 2, wherein
a cross-section of a passage of the duct becomes laterally narrow toward the discharge port of the duct, and
the discharge port of the duct is formed so that traveling air passing through the duct to collide against an edge of the front wheel when the vehicle is traveling straight, the edge being between the front portion of the front wheel and a flank of the front wheel facing an outside of the vehicle.

5. The vehicle front body structure according to claim 1, wherein
the duct further includes a passage along a side face of the front bumper which allows the intake port and the discharge port to communicate with each other.

6. The vehicle front body structure according to claim 5, wherein
the intake port is provided at a position where the intake port laterally overlaps the front wheel in a plan view of a vehicle.

7. The vehicle front body structure according to claim 1, wherein
the rear splash shield includes a vertical portion extending in the vertical direction to separate the engine room from the wheel house and a flange part extending laterally from an upper end of the vertical portion, and is coupled to a vehicle structural member via a fastening portion provided on the flange part.

8. The vehicle front body structure according to claim 7, wherein
the rear splash shield further includes a flange provided at a rear end in the front-and-rear direction at a place lower than the vertical portion and extending in a rear side of the vehicle body, and is coupled to a cross member of the sub-frame via a fastening portion provided on the flange.

9. A vehicle front body structure comprising:
a front bumper disposed in a front portion of a vehicle body;
wheel houses provided in right and left sides of the vehicle body, respectively, respectively, in a rear side of the front bumper;
a pair of front side frames provided in right and left portion portions, respectively, in the rear side of the front bumper, each of the front side frames extending in a front-and-rear direction;
a sub-frame disposed below the front side frames and between the right and left wheel houses;
deflectors disposed below right and left ends of the front bumper, respectively to suppress flowing of air from a front side into the wheel houses;
fender liners provided inside respective wheel arches constituting the respective wheel houses to cover a front side and a rear side of the respective wheel houses;
a front splash shield and a rear splash shield to suppress flowing of air from an engine room into the wheel houses, the front splash shield and the rear splash shield being provided between the respective front side frames and the sub-frame, and arranged in the front-and-rear direction so as to separate the engine room from the respective wheel houses laterally; and
ducts that are provided at right and left ends of the front bumper, respectively and cause traveling air from the front side to collide against a front portion of a front wheel in the wheel house to form an air curtain between a rearward face of the wheel house and the front portion of the front wheel, thus suppressing air from flowing out of the wheel house to a flank of the vehicle body.

10. The vehicle front body structure according to claim 9, wherein
the duct further includes a passage along a side face of the front bumper which allows the intake port and the discharge port to communicate with each other.

11. The vehicle front body structure according to claim 10, wherein the intake port is provided at a position where the intake port laterally overlaps the front wheel in a plan view of a vehicle.

12. The vehicle front body structure according to claim 9, wherein
the rear splash shield includes a vertical portion extending in the vertical direction to separate the engine room from the wheel house and a flange part extending laterally from an upper end of the vertical portion, and is coupled to a vehicle structural member via a fastening portion provided on the flange part.

13. The vehicle front body structure according to claim 12, wherein
the rear splash shield further includes a flange provided at a rear end in the front-and-rear direction at a place lower than the vertical portion and extending in a rear side of the vehicle body, and is coupled to a cross member of the sub-frame via a fastening portion provided on the flange.

14. A vehicle front body structure comprising:
a front bumper disposed in a front portion of a vehicle body;
wheel houses provided in right and left sides of the vehicle body, respectively, in a rear side of the front bumper;
a pair of front side frames provided in right and left portions, respectively, in the rear side of the front bumper, each of the front side frames extending in a front-and-rear direction;
a sub-frame disposed below the front side frames and between the right and left wheel houses;
deflectors disposed below right and left ends of the front bumper, respectively to suppress flowing of traveling air from a front side into the wheel houses;
splash shields provided between the respective front side frames and the sub-frame to suppress flowing of air from an engine room into the wheel houses; and
ducts provided at the right and left ends of the front bumper, respectively and each including an intake port that takes in traveling air from the front side, and a discharge port that discharges the traveling air, taken in from the intake port, into the wheel houses,
wherein the splash shields extend toward an upper side from an upper portion of the sub-frame to separate the engine room from the wheel houses, each of the splash shields including a plurality of recessed parts extending upward from a lower rim of the splash shield,
the plurality of recessed parts are disposed over a plurality of shaft members penetrating into the wheel houses from the engine room,
the discharge port of each of the ducts has a shape elongate in a vertical direction to discharge traveling air to a region elongate in the vertical direction on a front portion of a front wheel disposed in the wheel house, and
the deflectors each include a first inclined portion that is inclined downward at a large inclination angle toward a lower portion of the front wheel positioned in a rear side of the deflector, and a second inclined portion that is provided adjacent to and laterally further inner than the first inclined portion and inclined downward at an inclination angle smaller than the inclination angle of the first inclined portion toward a space located laterally further inner than the front wheel in the wheel house.

15. The vehicle front body structure according to claim 14, wherein
a cross-section of a passage of the duct becomes laterally narrow toward the discharge port of the duct, and
the discharge port of the duct is formed so that traveling air passing through the duct to collide against an edge of the front wheel when the vehicle is traveling straight, the edge being between the front portion of the front wheel and a flank of the front wheel facing an outside of the vehicle.

* * * * *